Nov. 11, 1952

H. J. SPENCER 2,617,097

FASTENER APPLYING DEVICE

Filed Nov. 1, 1949

INVENTOR.
Herman J. Spencer
BY
Webb, Mackey & Burden
HIS ATTORNEYS

Nov. 11, 1952　　　　　H. J. SPENCER　　　　　2,617,097
FASTENER APPLYING DEVICE
Filed Nov. 1, 1949　　　　　　　　　　　　　　　6 Sheets-Sheet 2

INVENTOR.
Herman J. Spencer
BY
Webb, Mackey + Burden
HIS ATTORNEYS

Nov. 11, 1952          H. J. SPENCER          2,617,097
FASTENER APPLYING DEVICE

Filed Nov. 1, 1949                                            6 Sheets—Sheet 3

INVENTOR.
Herman J. Spencer
BY
Webb, Mackey + Burden.
HIS ATTORNEYS

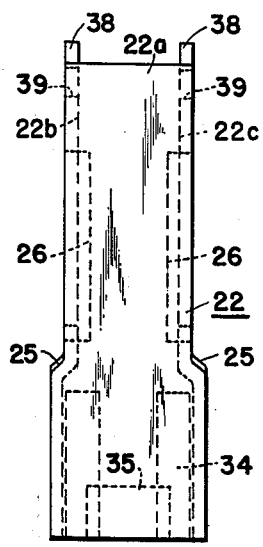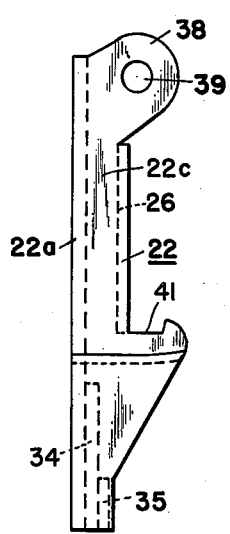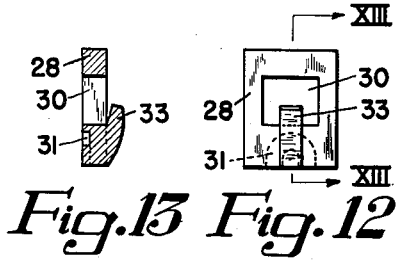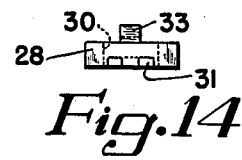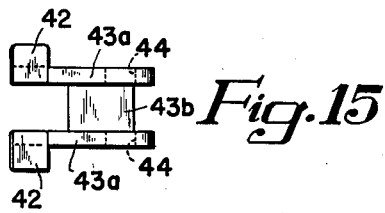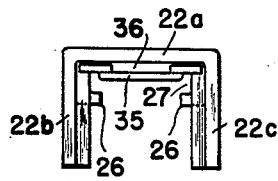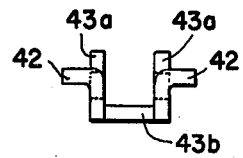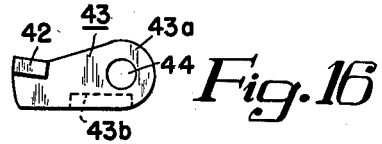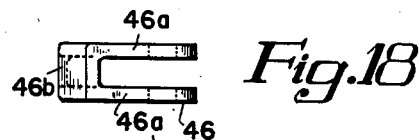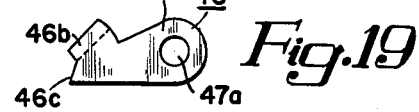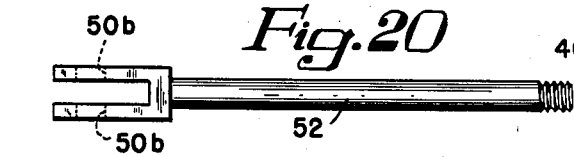

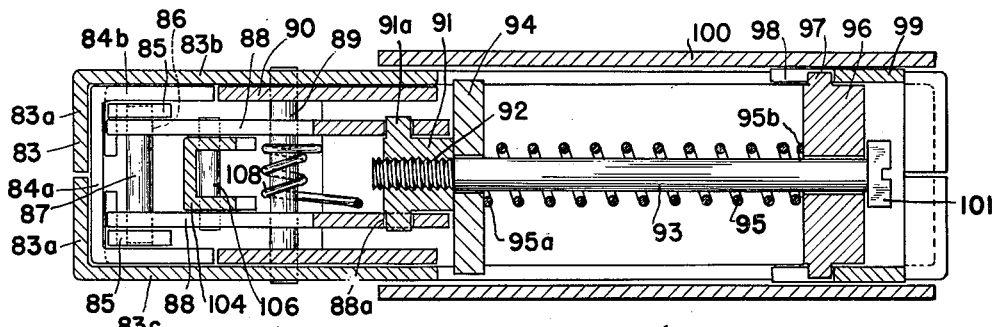
Fig.32
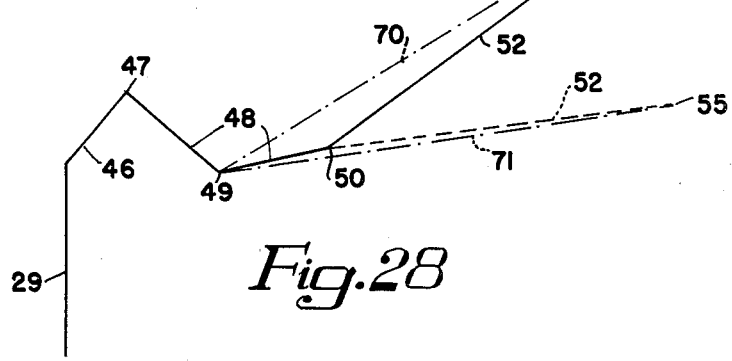
Fig.28
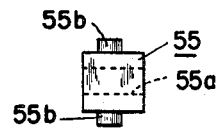
Fig.25
Fig.26
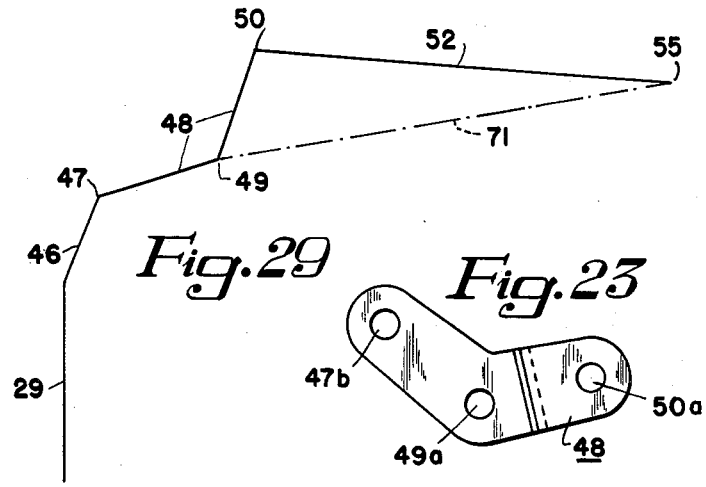
Fig.29　Fig.23
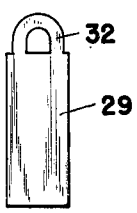
Fig.27
Fig.24
INVENTOR.
Herman J. Spencer
BY
HIS ATTORNEYS Nov. 11, 1952  H. J. SPENCER  2,617,097
FASTENER APPLYING DEVICE
Filed Nov. 1, 1949  6 Sheets-Sheet 6
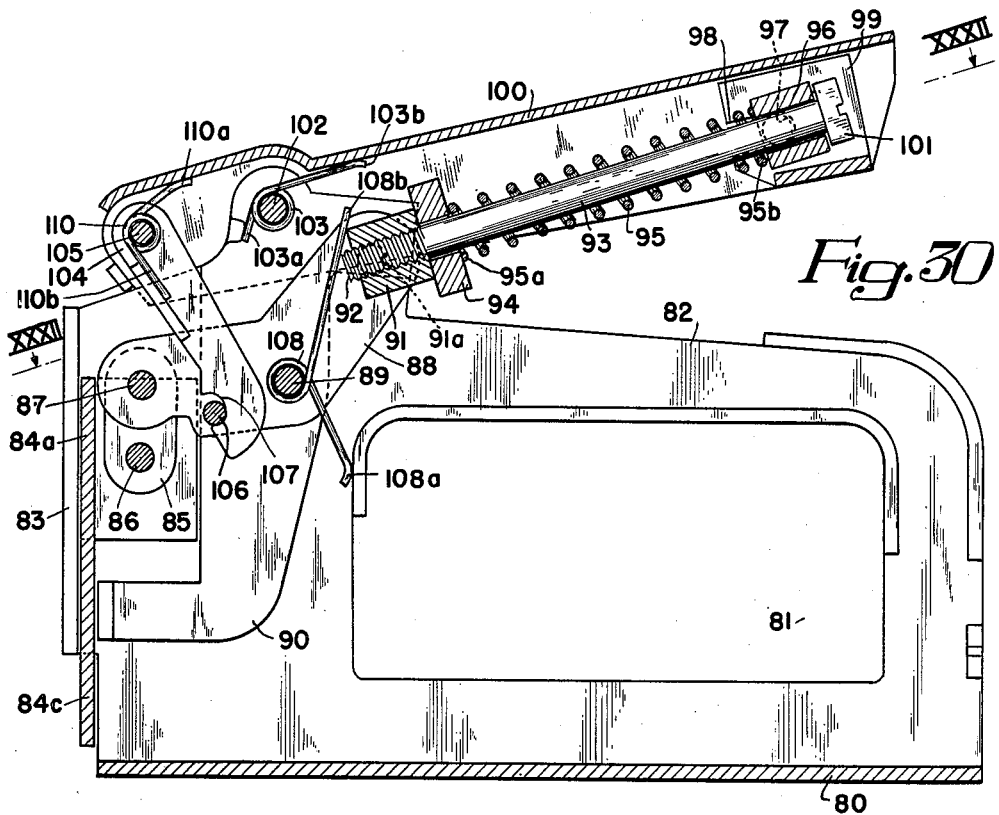
INVENTOR.
Herman J. Spencer
BY
Webb, Mackey + Burden.
HIS ATTORNEYS Patented Nov. 11, 1952

2,617,097

UNITED STATES PATENT OFFICE 2,617,097

FASTENER APPLYING DEVICE

Herman J. Spencer, Ingomar, Pa.

Application November 1, 1949, Serial No. 124,790

14 Claims. (Cl. 1—49)

This invention relates to a fastener applying device such for example as a stapling or tacking device in which staples or other fasteners are fed to a staple driving throat and are then acted upon by a spring actuated staple driver. The staple driver is actuated by a spring in which energy is stored upon depression of a manually operated lever, the driver being held in raised position or raised as the manually operated lever is depressed and thereafter when energy is stored in the spring the driver is released so as to cause it to move downwardly and drive a staple under the action of the spring.

One object of the invention is to provide mechanism which will restrict the driving power of the actuating spring during the initial part of the driving stroke, thereby reducing the destruction which would be caused if a staple became jammed, but which thereafter produces a powerful driving stroke.

Another object of the invention is to provide a large amount of travel of the driver so that the driver has an opportunity to gather momentum before the fastener is actually driven into an object to be fastened.

Still another object of the invention is to provide a wide arc or leverage action which increases the leverage of the operating lever more uniformly throughout the operation of said lever.

In the accompanying drawings which illustrate a present preferred embodiment of my invention—

Figure 9 is a front elevation, Figure 10 is a side elevation, and Figure 11 is a bottom plan view of the pivoted staple driver guide;

Figure 12 is a front elevation, Figure 13 is a vertical section taken on the line XIII—XIII of Figure 12, and Figure 14 is a bottom plan view of the block forming a part of and holder for the staple driver;

Figure 15 is a plan view, Figure 16 is a side elevation and Figure 17 is an end elevation of a latch for locking the pivoted staple driver guide shown in Figures 9, 10 and 11 in operative position;

Figure 18 is a plan view and Figure 19 is a side elevation of a link which connects the staple driver block with the spring actuated rocker arms;

Figures 20, 21 and 22 are, respectively, a plan, a side elevation and an end view of a bolt which connects the manually operated lever with the rocker arms and acts as a spring guide;

Figures 23 and 24 are, respectively, a side elevation and a plan view of one of the rocker arms forming a part of the staple driving mechanism;

Figures 25 and 26 are, respectively, a plan view and an end view of a swivel block;

Figure 27 is a front elevation of the staple driving blade;

Figures 28 and 29 are schematic diagrams showing the staple driving mechanism in different positions;

Figures 30, 31 and 32 illustrate a different embodiment of the invention.

Figure 30 is a vertical longitudinal section through the device with the parts in their starting positions;

Figure 31 is a view similar to Figure 30 but showing the parts after the manually operated lever has been depressed and the staple driver has been raised and the driving spring has been compressed but prior to the downward stroke of the staple driver; and Figure 32 is a transverse section taken on the line XXXII—XXXII of Figure 30.

Figure 1:
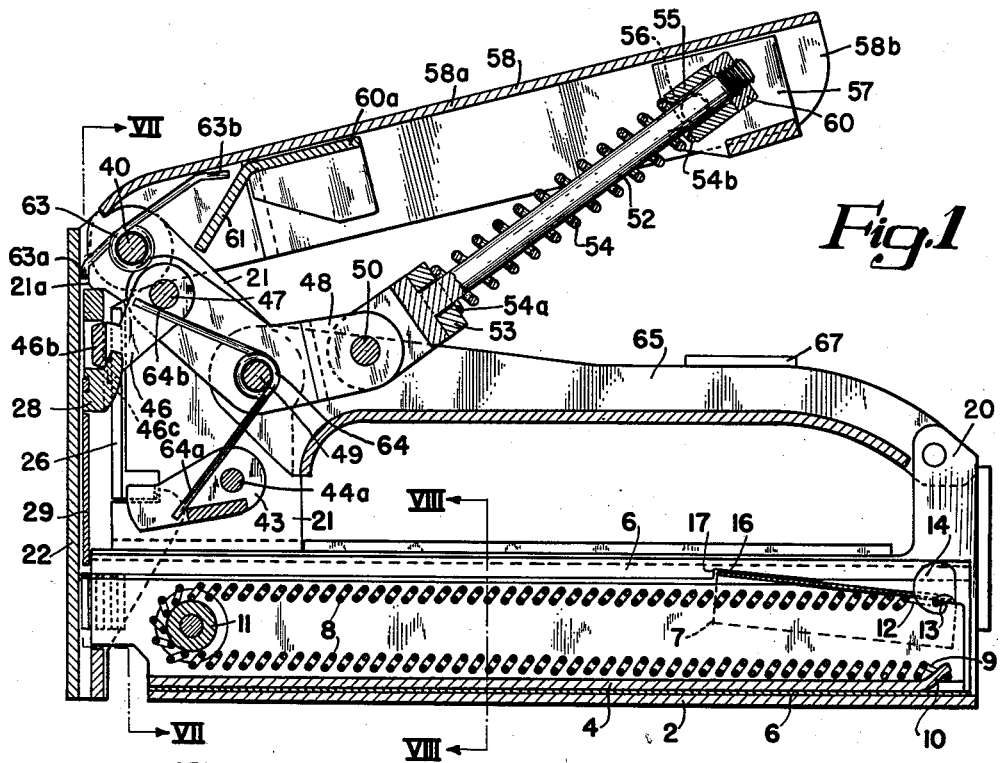
Figure 1 is a vertical longitudinal section through the device with the parts in their starting positions.
Figures 6, 7:
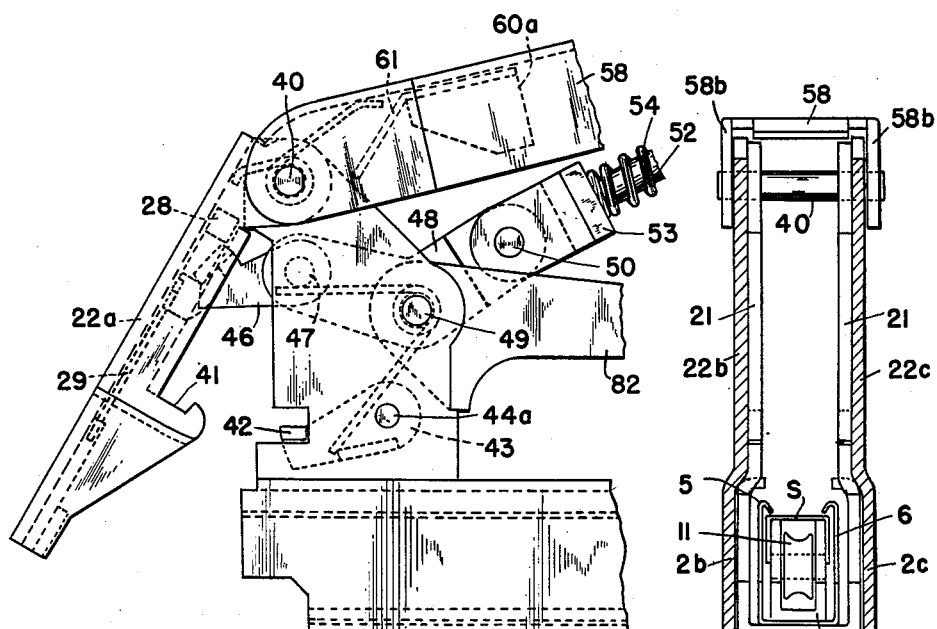
Figure 6 is a side elevation of the front portion of the machine, showing the staple driver guide swung to its open position.
Figure 7 is a vertical transverse section taken on the irregular line VII—VII of Figure 1.
Figure 8:
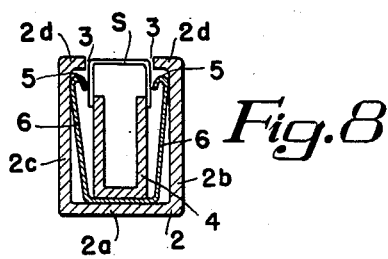
Figure 8 is a vertical section corresponding to a section taken on the line VIII—VIII of Figure 1 but illustrating the manner in which a strip of staples is inserted into the staple magazine, certain parts being omitted.

Referring more particularly to the accompanying drawings and for the present to the embodiment illustrated in Figures 1–30, the base 2 of the machine constitutes a staple magazine in which a stick of staples is inserted and the individual staples are fed forwardly to a staple driving throat underneath a staple driving blade and there acted upon by the staple driving blade as hereinafter explained. The staple magazine 2 is a box-like structure made of sheet metal and is substantially U-shaped in cross-section. It has a base 2a, see Figure 8, a vertical side wall 2b, and a vertical side wall 2c. The top edges of the walls 2b and 2c are turned in, as illustrated at 2d, leaving a space or slot 3 through which a stick of staples S can be inserted. The stick of staples is placed over a U-shaped staple guide 4, as shown in Figure 8, and the stick is pressed downwardly so as to press the hooked ends 5 of the resilient staple hold-down member 6 aside so as to allow the staples to be placed on the guide. Thereafter, the resilient hold-down members 6 snap over the staples so that they assume the position shown in Figure 7. The staples are moved forwardly along the guide 4 by a staple pusher or follower 7, shown in Figure 1. The staple follower is of inverted U-shape in cross-section and is of the same configuration as the staples. It is moved forward by a coil spring 8, one end 9 of which is secured to an upturned end 10 of the staple guide 4. The spring passes around a pulley 11 located at the forward end of the staple magazine and its other end 12 fits in a slot 13 formed in a tab 14 which is integral with the body of the staple pusher. The rear end 15 of the staple guide 4 is sloped downwardly and rearwardly so that the pusher can be tilted as shown in Figure 1, in which position the forward end 16 of the pusher fits into a notch 17 formed in the hold-down member 6. The staple pusher is moved to the tilted position shown in Figure 1 only when a stick of staples is inserted into the staple magazine 2. In its normal and operative position the hold-down member is horizontal and lies behind and in line with the stick of staples and below the inturned flanges 5 of the hold-down member 6. In this position the pusher moves the staples forwardly in the magazine to a position underneath the staple driving blade to be described.

The rear end of the staple magazine 2 is provided with two upstanding brackets 20 which are spaced apart transversely of the machine. The forward portion of the staple magazine is provided with two upstanding brackets 21 spaced transversely of the machine. A lower hand grip portion 65 is connected at one end to the brackets 20 and at the other end to the brackets 21. The front end of the machine is closed by a staple driver guide indicated generally by the reference numeral 22, which guide is shown in Figures 9, 10 and 11. This guide is of general U-shape in cross-section, having a front vertical wall 22a, a rearwardly extending vertical side wall 22b, and a rearwardly extending vertical side wall 22c. The guide 22 is open at the top and bottom. The guide is formed with a shoulder 25, the lower part of the guide being somewhat wider than the upper part. The sides 22b and 22c of the guide have inturned flanges 26, which provides a space 27 (see Figure 11) in which a staple driver block 28 (see Figure 13) slides. Referring to Figures 12, 13, 14 and 27, the staple driver comprises a blade 29, which forms the lower part of the driver, and a block 28 which forms the upper part of the driver. The block is generally rectangular in front view, as shown in Figure 12, and is provided with an opening 30 for a purpose later described. Its front face is provided with an arcuate slot 31, which receives the arcuate upper portion 32 of the blade 29. The rear face of the block has an upwardly extending projection 33.

It will be seen that when the arcuate portion 32 of the blade is pressed into the arcuate slot 31 of the block 28, and the two parts of the staple driver are placed in position within the staple driver guide 22, that the blade 29 is securely connected to the block 28 and that the block 28 is guided between the front wall 22a of the guide 22 and the inturned flanges 26. The lower part of the guide 22 has two vertical plates 34 for guiding the blade 29 and a plate 35 secured to the plates 34, the plate 35 being spaced from the front wall 22a to provide a staple driving throat 36 shown in Figure 11, which guides the staple and the lower end of the blade 29.

The upper end of the guide 22 is formed with ears 38 provided with holes 39. The guide 22 is pivoted on a pin 40 which extends through the holes 39 and through holes formed in the frame brackets 21. Accordingly, the guide 22 can be swung to the open position shown in Figure 6 in order to remove a jammed staple. The guide 22 is formed with notches 41 (see Figure 10) which receive the ears 42 of the latch shown in Figures 15, 16 and 17 when the guide is moved to locked position. The latch 43 has two sides 43a and a cross piece 43b. The side pieces 43a are formed with holes 44 which receive a pin 44a which is supported by the frame brackets 21.

A link 46 (see Figures 18 and 19) is pivoted on a pin 47 (see Figure 1) extending into holes 47a in the link 46 and into holes 47b formed in two rocker arms 48, one of which is shown in Figures 23 and 24. The rocker arms are pivoted on a pin 49 which extends through holes 49a formed in the rocker arms and into holes formed in the frame brackets 21.

Referring more particularly to the removable connection between the link 46 and the driver block 28, the link 46 has two vertical sides 46a and a bridging eye portion 46b connecting these two side portions. This eye portion 46b of the link 46 fits over the hook 33 of the block 28 (see Figures 12 and 13) and the bridging portion 46b is received in the opening 30 in the block. Hook 33 prevents the rearward movement of link 46 by contact with the bridging eye portion 46b and said bridging portion cannot move vertically due to contact with the upper and lower surfaces of opening 30 in block 28. Lugs 46c keep the link from sliding forward. The connection between the link 46 and the block 28 is such as to enable a rocking motion between the two parts while still retaining them connected together.

The rear ends of the rocker arms 48 are offset inwardly toward each other and are provided with holes 50a which receive a pin 50. This pin is mounted in holes 50b formed in the forked end of a bolt 52 (see Figure 21). Thus the bolt 52 is pivotally connected by the pin 50 to the rocker arms 48. A thrust washer 53 fits loosely around the left-hand end of the bolt 52 so that the bolt and washer can move relative to each other. A coil spring 54 fits around the bolt 52 and has one end 54a pressing against the thrust washer 53 and the other end 54b pressing against a swivel block 55 illustrated in Figures 25 and 26. This swivel block has a bore 55a for slidably receiving the end of the bolt 52 and has two trunnions 55b which fit into open sided slots 56 formed in a bracket 57 secured to the underside of an operating lever 58 which is of inverted U-shaped in cross-section and comprises a top wall 58a and two downwardly extending side walls 58b. The end of the bolt 52 which extends through the swivel block 55 is threaded to receive a nut 60.

The operating lever 58 is pivotally mounted adjacent its forward end on the pin 40 which is supported in the frame brackets 21. A bracket 60a which acts to limit the downward movement of the staple driver at the end of the driving stroke, as later explained, is secured to the underside of and movable with the operating lever 58. The forward end of this bracket 60a has a cam portion 61 which positively rocks the rocker arms 48 when the operating lever 58 is rotated to the position shown in Figure 3, thereby lowering the driving plunger, resulting in the shearing and lowering of a staple from the supply of staples. A spring 63 is coiled around the pin 40 and has an end 63a pressing against the upper inner portion of the staple driver guide 22 and an end 63b which presses against the underside of the operating lever 58. The spring 63 serves the two purposes of returning the operating lever 58 to its starting position after a staple driving operation and also of swinging the staple driver guide 22 to the open position shown in Figure 6 when the guide is unlocked from the latch 43. A spring 64 is coiled around the pin 49 and has one end 64a pressing against the latch 43 for holding it in locking position. The other end 64b of the spring presses against the underside of the pin 47 which connects the link 46 with the rocker arms 48, the spring end 64b urging the staple driving block 28 and the staple driving blade 29 to the raised starting position shown in Figure 1 after a staple has been driven.

The operation of the fastener device is as follows. Assume that a supply of staples S is in the staple magazine 2 and that the staple pusher 7 has been moved from the tilted position shown in Figure 1 to a horizontal position so that the staple pusher is operative to exert pressure through the spring 8 against the staples to feed them forwardly through the staple magazine 2. The operating lever 58 is rotated clockwise about its pivot point 40 until it assumes the position shown in Figure 2 where the bracket 57 contacts a plate 67 on the hand grip 65. As the operating lever moves from the position shown in Figure 1 to that shown in Figure 2, the distance between the pivot point 50 and the pivot of the swivel block 55 on the operating lever 58 decreases, thereby compressing the driving spring 54. It will be seen that in Figure 1 the pivot pin 50 which connects the bolt 52 and the rocker arms 48 lies below the line connecting the pivot pin 49 and the pivot point 55, this line being designated by the reference numeral 70 in Figure 28. So long as this condition exists, while the operating lever is being rotated in a clockwise direction the driving spring 54 is being compressed and the spring is exerting its pressure in such direction as to tend to rotate the rocker arms 48 clockwise and to maintain the staple driver 28 in its raised position, the raised position of the block 28 being determined by contact of the block with a projection 21a on the frame 21 (see Figure 1). When the operating lever has reached the position shown in Figure 2, the driving spring 54 has been compressed and the pin 50 is slightly above the line (designated 71 in Figure 28) which joins the pivot 49 with the pivot 55. In this position the spring 54 tends to rotate the rocker arms 48 counterclockwise and to lower the staple driver. When the rocker arms have rotated slightly further in a counterclockwise direction to the position shown in Figure 3, the staple driver blade 29 has been lowered enough to contact the leading staple S and move it downward slightly. The force exerted on link 46 by the spring 54 at this stage is rather slight due to the fact that the pivot point 50 is only slightly above the line 71 and therefore if a staple becomes jammed it does not cause rupture of the machine. If jamming occurs the guide 22 can be swung to the open position shown in Figure 6 and the jammed staple removed after the operating lever 58 has been released by the operator and allowed to return to the position shown in Figure 1. However, as the rocker arms 48 move to the position shown in Figures 4 and 29, the leverage action of the spring on the rocker arms becomes greater and greater force is exerted on the staple driver through the link 46. Thus the greatest force on the staple is obtained toward the end of the driving stroke, where it is desirable, rather than at the beginning of a driving stroke in which it might cause rupture of the machine due to a jammed staple.

Figure 2:
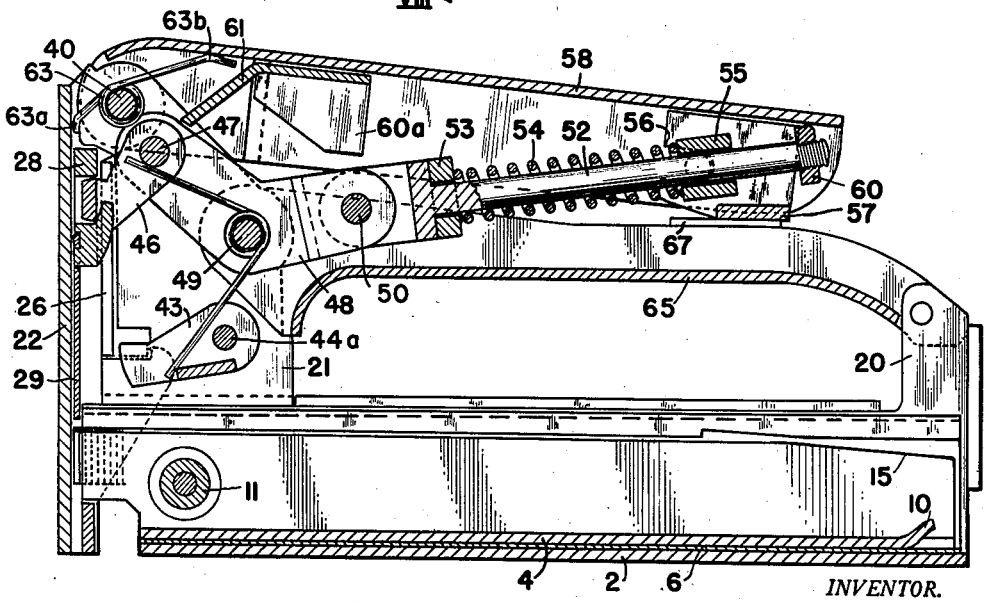
Figure 2 is a view similar to Figure 1 but showing the parts at that stage of a staple driving stroke in which the manually operated lever has been fully depressed.

In order to aid in rotating the rocker arms 48 in a counterclockwise direction just before the operating lever 58 has reached substantially the position shown in Figure 2, the bracket 60a on the operating lever may be provided with a cam portion 61 which contacts the left-hand portion of the rocker arms 48 just before the operating lever reaches the position shown in Figure 2. However, this cam portion can be omitted since the operation can be accomplished without its use but it will be used on certain types of staples which are bonded together more securely than others and where it is desired to lower or partially drive a staple while the driving spring is being compressed.

Figure 4:
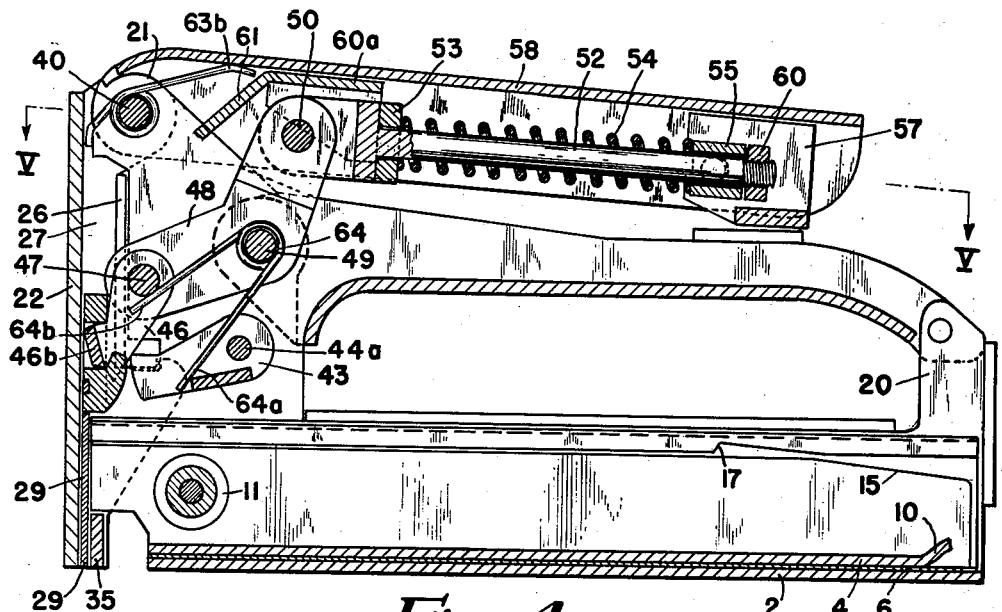
Figure 4 is a view similar to the previous figures but showing the parts in the positions which they occupy toward the end of a staple driving stroke.
Figure 3:
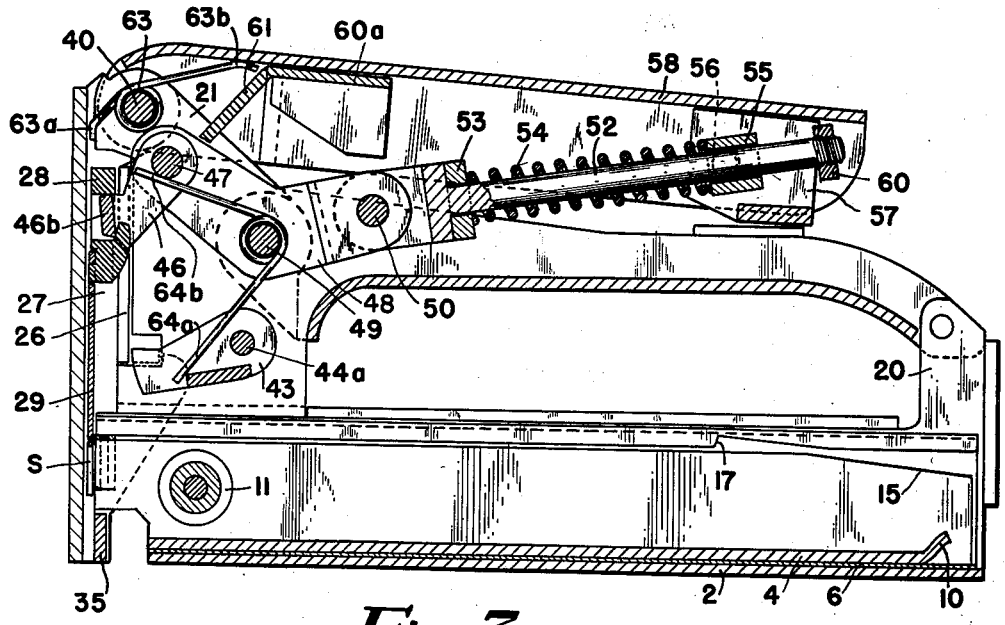
Figure 3 is a view similar to Figures 1 and 2 but showing the parts in the positions which they assume at a slightly later stage of the staple driving stroke after the toggle has passed dead center.
Figure 5:
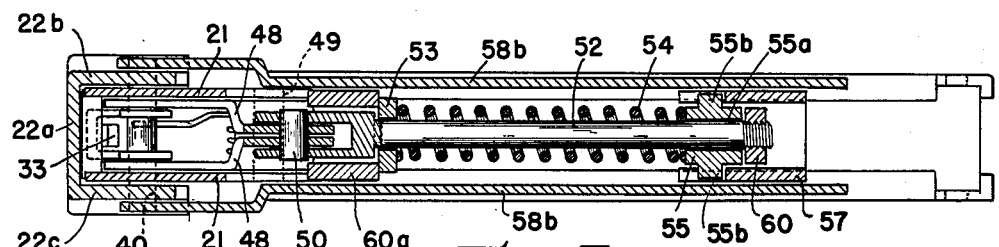
Figure 5 is a horizontal longitudinal section taken on the line V—V of Figure 4, certain parts being omitted for clearness of illustration.

It will be noted that in Figures 2 and 3 the nut 60 on the bolt 52 has moved away from the swivel block 55. As the parts move from the position shown in Figure 3 to that shown in Figure 4 the spring 54 expands and the nut 60 approaches the swivel block 55 and the thrust washer 53 approaches the stop bracket 60a. As shown in Figure 4, the nut 60 contacts the swivel block at approximately the same time as the thrust washer 53 contacts the bracket 60a. After the thrust washer 53 has contacted the bracket 60a, the momentum of the rocker arms 48 causes them to rotate counterclockwise slightly further from the position shown in Figure 4, and this causes the driver blade 29 to move downward slightly further from the position shown. Since the thrust washer 53 is in contact with the bracket 60a and the nut 60 is in contact with the swivel block 55, this further momentum movement of the rocker arms pulls the bolt 52, nut 60 and the swivel block to the left from the positions shown in Figure 5 and causes the swivel block to move to the left in its slot 56, thereby recompressing the spring 54 between washer 53 and swivel block 55 and thereby cushioning the final stage of the staple driving operation. During the staple driving operation the link 46 and pin 47 move downwardly, thereby tensioning the spring leg 64b.

After a staple has been driven, the spring end 64b which is in contact with the pin 47 raises the link 46, driver block 28 and driver blade 29 to the starting position shown in Figure 1, and the spring end 63b raises the operating lever 58 to its starting position.

Figures 30, 31 and 32 illustrate a modification of the invention. The device comprises a base or frame 80 having a window 81 and a hand grip portion 82. A staple driver guide indicated generally by the reference numeral 83 is located at the forward end of the machine. This guide comprises two front wall portions 83a, a side wall 83b and a side wall 83c, the guide being generally of U-shape in horizontal cross-section, as shown in Figure 32. A staple driver 84 is arranged within the guide 83, this staple driver comprising an upper portion which is U-shaped in horizontal cross-section, comprising a front wall 84a and two side walls 84b. A rectangular plate 84c forms the lower part of the staple driver, the upper and lower parts of the driver being made integral with each other. Two links 85 are located inside of the driver 84 and are pivotally connected to the driver by a pin 86. The upper ends of the links 85 are pivotally connected by a pin 87 to two rocker arms 88 which are pivoted to the frame by a pin 89. The pin 89 also extends through plates 90 which form a part of the guide for the staple driver 84. At its right-hand end each of the rocker arms 88 is formed with a hole 88a which receives a trunnion 91a extending outwardly from each side of a nut 91 so that the nut is pivotally mounted between the rocker arms. The nut 91 is internally threaded to receive the threaded end 92 of a bolt 93. A thrust washer or disc 94 fits loosely on the bolt 93. A spring 95 fits around the bolt and has one end 95a pressing against the washer 94 and its other end 95b against a swivel block 96 having trunnions 97 pivotally mounted in open sided slots 98 formed in a bracket 99 secured to an operating lever 100. The bolt 93 fits loosely in a bore formed in the swivel block 96 and has a head 101.

The operating lever 100 is pivotally mounted adjacent its forward end on a pin 102 mounted in the frame of the machine. A spring 103 is coiled around the pin 102 and has one end 103a pressing against the frame and the other end 103b pressing against the under side of the operating lever 100 in order to raise the operating lever to starting position after a staple driving stroke.

A latch 104 is pivotally mounted on a pin 105 supported by the operating lever 100. The latch 104 has a notch 107 which receives a pin 106 which extends between and is supported by the rocker arms 88. A spring 108 is coiled around the pin 89 and has one end 108a pressing against the frame 82 and the other end 108b pressing against the nut 91.

The operation of the device is as follows. As the operating lever 100 is depressed it rotates clockwise about the pivot pin 102. Clockwise rotation of the operating lever 100 raises pin 105, latch 104, pin 106 and link 85. It also causes clockwise rotation of rocker arms 88 and compression of spring 95. When link 85 has been raised to the position shown in Figure 31, the pin 87 contacts the cross-piece 104a of latch 104, thereby releasing the pin 106 from its notch 107. Thereafter the rocker arms 88 are free to rotate counterclockwise about the pin 89 under the expansion of the driving spring 95. This causes lowering of the staple driver 84 so as to drive a staple arranged in proper position under the driver. A spring 110, coiled around pin 105, has one end 110a pressing against the underside of the forward end of the operating lever 100 and its opposite end 110b pressing against the latch 104 to maintain the latch in contact with the pin 106 until the latch 104 is moved away from the pin 106 by contact of the pin 87 with the latch as described. The function of spring end 108b which contacts the nut 91 connected to the bolt 93 is to urge the rocker arms clockwise so as to keep pin 106 in engagement with latch 104. After the parts have reached the position shown in Figure 31 and the pin 106 has been released from the latch 104, the driving spring 95 expands and causes counterclockwise rotation of the rocker arms 88. Rotation of the rocker arms is limited by contact of the thrust washer 94 with the upper parts 90a of plates 90. After washer 94 has been stopped by parts 90a and head 101 of bolt 93 has contacted the swivel block 96, the momentum of the rocker arms 88 pulls the bolt 93, nut 101 and the swivel block 96 to the left from the positions shown in Figure 32 and causes the swivel block to move to the left in its slot 98, thereby recompressing the spring 95 between washer 94 and swivel block 96 and cushioning the end of the driving stroke.

While I have illustrated and described preferred embodiments of the invention, it is to be understood that the invention may be otherwise embodied or practiced within the scope of the following claims.

I claim:

1. In a fastener applying device, a driving plunger reciprocably mounted in a plunger guide, means for feeding fasteners into position to be driven by said plunger, means for actuating said plunger during a fastening operation, said plunger having an opening and a hook portion extending upwardly from the rear face of said plunger to a point above the lower edge of said opening, a link connecting said plunger to said actuating means, said link having an eye portion adapted to fit over and be restrained from rearward movement by said hook portion, said eye portion being received in said opening and being restrained from vertical movement thereby, said link also having a lug adapted to contact the rear face of said plunger to prevent forward sliding movement of the link, said connection permitting a rocking motion between said link and said plunger but preventing vertical and horizontal movement between said link and said plunger.

2. In a fastener applying device, a frame, a fastener driver reciprocably mounted in a driver guide, means for feeding fasteners into position to be driven by said driver, an operating lever pivoted to said frame, a rocker arm pivoted to said frame and operably connected to said driver to actuate the latter, a spring guide pivotally connected adjacent one end to said rocker arm and adjacent its other end pivotally connected to said operating lever, and a driving spring carried by said spring guide and interposed between said pivots of said spring guide and adapted to be compressed on depression of said operating lever and thereafter to expand to thereby exert pressure on said rocker arm to rotate the latter to apply a fastener.

3. In a fastener applying device, a frame, a fastener driver mounted for reciprocable movement in a driver guide, a rocker arm pivoted to said frame and operatively connected to said driver to actuate the latter, an operating lever pivoted to said frame, a spring guide pivotally connected to said rocker arm and said operating lever, and a driving spring carried by said spring guide and interposed between said pivots of said spring guide for actuating said rocker arm upon depressing said operating lever.

4. In a fastener applying device, a frame, a fastener driver mounted for reciprocable movement in a driver guide, means for feeding fasteners into position to be driven by said driver, said driver being below driving position at the start thereby blocking a fastener from being fed, a rocker arm pivoted to said frame and operatively connected to said driver to actuate the latter, an operating lever pivoted to said frame, a spring guide pivotally connected at one end to and movable with said rocker arm and adjacent its other end pivotally supported on and movable with said operating lever, cooperating means between said spring guide and the latter's pivotal connections permitting the latter to move towards each other, a driving spring carried by said spring guide and interposed between said pivotal connections of said spring guide, said spring adapted to be compressed upon depression of said operating lever and thereby exert pressure on said rocker arm to rotate the latter, releasable latching means cooperating between said operating lever and said driving mechanism to rotate said rocker arm in reverse fastener applying direction as said operating lever is depressed, thereby lifting said driver above said fasteners to driving position and thereby permitting a fastener to be fed into driving position below said driver, obstruction means adapted to release said latching means from its cooperating action as said operating lever is depressed and said driver is raised and said rocker arm is rotated reversely, thereby permitting said driving spring to expand to urge said rocker arm in fastener applying direction to apply a fastener.

5. In a fastener applying device having a spring actuated plunger reciprocably mounted in a plunger guide and means for feeding fasteners into position to be driven by said plunger, actuating means including a pivoted rocker arm operably connected to said plunger to reciprocate the latter to apply a fastener, a driving spring having one end operably connected to and bodily movable with said rocker arm around the pivot of said rocker arm to rotate the latter during a fastener applying stroke, the extended direction of said spring's force against said rocket arm being adjacent the pivot of said rocker arm at the beginning of a fastener applying stroke, the rotation of said rocker arm by said spring during a fastener applying stroke acting to move the extended direction of the spring's force against the rocker arm from a position adjacent to a position away from the pivot of said rocker arm, thereby increasing the leverage action of said spring on said rocker arm during a fastener applying stroke.

6. In a fastener applying device, a driving mechanism for a fastener driver, means for feeding fasteners into position to be driven by said driver, said mechanism comprising the following component parts in their starting position, a frame, a fastener driver mounted for reciprocable movement in a driver guide, a rocker arm pivoted on said frame and operatively connected to said driver to reciprocate the latter, an operating lever pivoted to said frame, a spring guide pivotally connected adjacent one end to and movable with said rocket arm and pivotally connected adjacent its opposite end to and movable with said operating lever, cooperating means between said spring guide and the latter's pivotal connections permitting the latter to move towards each other, a driving spring carried by said spring guide and interposed between said guide's pivoted connections and adapted to be compressed on depression of said operating lever and thereby exert pressure on said rocker arm to rotate the latter, the axis of said driving spring on said spring guide upon depression of said operating lever to compress said spring being movable in an arc about the center point of said spring guide's pivoted connection with said rocker arm from a position in which the extension of said driving spring's axis passes from one side of the pivot of said rocker arm on the frame to a position in which the extension of said spring guide's axis passes to the opposite side of the pivot of said rocker arm on said frame, whereby on depression of said operating lever, said driving spring is compressed and thereby exerts pressure on said rocker arm in reverse fastener applying direction and then reverses the direction of said pressure on said rocker arm permitting said spring to expand to urge said rocker arm in fastener applying direction.

7. In a fastener applying device, a frame, a reciprocable fastener driver, means for feeding fastener into position to be driven by said driver, a rocker arm pivoted on said frame and operatively connected to said driver to actuate the latter, an operating lever pivoted to said frame, a spring guide pivoted adjacent one end to and movable with said rocker arm and adjacent its other end pivotally connected to and movable with said operating lever, a driving spring carried by said spring guide and interposed between said pivots of said spring guide, and adapted to be compressed to exert pressure against said rocker arm to rotate the latter with the direction of said spring's force against said rocker arm being movable on depression of said operating lever from a position in which said spring urges the rocker arm to rock in one direction to raise the fastener driver to a position in which the spring urges the rocker arm to rock in a direction to lower the fastener driver.

8. In a fastener applying device, a frame, a fastener driver mounted for reciprocable movement in a driver guide, a rocker arm pivoted to said frame and operably connected to said driver to reciprocate the latter, an operating lever pivoted to said frame, a spring guide pivotally connected adjacent one end to said rocker arm and adjacent its other end pivotally connected to said operating lever, a driving spring carried by said spring guide and interposed between said pivots of said spring guide and adapted to be compressed on depression of said operating lever and thereby exert pressure on said rocker arm to rotate the latter.

9. A device according to claim 8, further characterized by the pivot point of said spring guide with said rocker arm moving closer to a line drawn between said spring guide's pivot on said operating lever and the pivot of said operating lever on said frame as said operating lever is depressed, thereby increasing the leverage advantage of said operating lever as it is depressed.

10. In a fastener applying device having a driving plunger reciprocably mounted in a plunger guide, means for feeding fasteners into position to be driven by said plunger, means for actuating said plunger during a fastener operation, a link pivoted at one end to said actuating means and having a hooked connection with said driving plunger at its opposite end for operably connecting said plunger with said actuating means, said link and said plunger constituting cooperating parts, one of said cooperating parts having a hook portion and the other of said cooperating parts having an opening for receiving the hook portion of the cooperating part, the hook portion being tiltable in its opening but being otherwise confined against substantial vertical and horizontal movement.

11. In a fastener applying device, a fastener driver reciprocably mounted in a driver guide, means for feeding fasteners into position to be driven by said fastener driver, an operating lever pivoted on said frame, a driver actuating means operably connected to said driver to reciprocate the latter, a spring guide pivoted on and movable with said actuating means adjacent one end and having a pivotal support on and movable with said operating lever at its opposite end, the pivotal support of said spring guide on said operating lever being movable in relation to the latter, said spring guide being slidable in said pivotal support, a thrust washer loosely mounted on and movable with said spring guide and located between an end of the spring and the pivot of the spring guide on said actuating means, a driving spring carried by said spring guide and interposed between said thrust washer and the spring guide's pivotal support on said operating lever for urging said thrust washer and said pivotal support away from each other, and a stop on said spring guide for limiting expansion of said driving spring on said spring guide, said driving spring being adapted to be compressed between said thrust washer and said spring guide's pivotal support on said operating lever as said operating lever is depressed whereby said spring exerts pressure on said actuating means to rotate the latter.

12. A device according to claim 11, further characterized by a stop on the device in the path of said thrust washer as the latter moves with said driver actuating means for limiting the driving movement of said thrust washer, and said driving spring, thereby opposing the driving end of said driving spring from further movement in the driving direction.

13. In a fastener applying device, a frame, a fastener driver mounted for reciprocable movement in a driver guide, a driver actuating means operably connected to said driver to actuate the latter, a spring guide pivoted at one end by a guide supporting member to and movable with said driver actuating means, a driving spring on said guide having its driving end adjacent said guide supporting member and extending along said guide adjacent to a spring guide supporting means spaced apart from said guide supporting member, said guide supporting means being movably mounted, said driving spring being supported by said spring guide and interposed between said guide supporting member and said guide supporting means for urging said driver actuating means in fastener applying direction, a thrust washer loosely mounted on said spring guide and interposed between said guide supporting member and the driving end of said spring, means permitting relative movement of said guide supporting member and said guide supporting means toward each other for compressing said driving spring, means on said spring guide for limiting the maximum distance between said spring guide supporting member and said spring guide supporting means under the influence of said spring, a stop in the path of said thrust washer and the driving end of said driving spring as said washer and said spring end move with said driver actuating means in fastener driving direction, said stop adapted to oppose the driving end of said driving spring from urging said driver actuating means, said driving spring's opposite end acting thereafter to oppose said movable guide supporting means and said spring guide from moving in fastener applying direction, said driving spring thereby acting as a cushion to stop fastener applying movement of said driver and its actuating means.

14. In a fastener applying device, a frame, a fastener driver reciprocably mounted in a driver guide, means for feeding fasteners into position to be driven by said driver, an operating lever pivoted adjacent one end to the frame, a rocker arm below said operating lever pivoted intermediate its ends to said frame and having one end operatively connected to said driver, a spring guide pivotally connected adjacent one end to the other end of said rocker arm and having its other end slideable through a swivel block, a bracket secured to said operating lever, said bracket provided with an open ended slot opening toward said driver, said swivel block being mounted in said slot, a compression driving spring surrounding said spring guide, a washer loosely mounted on said spring guide, said driving spring being interposed between said washer and said swivel block, a stop on said operating lever contacting said washer for preventing further movement of said washer after said driving spring has expanded in performing a fastener driving operation, and a stop on said spring guide and moveable therewith for moving said swivel block in the slot in said bracket and along said spring guide toward said washer to compress said driving spring, thereby cushioning the driving stroke of said driver.

HERMAN J. SPENCER.

REFERENCES CITED

The following references are of record in the file of this patent:

UNITED STATES PATENTS

| Number | Name | Date |
|---|---|---|
| 1,905,254 | Vogel | Apr. 25, 1933 |
| 2,086,922 | Peterson | July 13, 1937 |
| 2,095,659 | Cavanagh | Oct. 12, 1937 |
| 2,154,755 | Krantz | Apr. 18, 1939 |